United States Patent [19]

Nagler

[11] Patent Number: 4,749,271
[45] Date of Patent: Jun. 7, 1988

[54] FINDER SCOPE FOR USE WITH ASTRONOMICAL TELESCOPES

[76] Inventor: Albert Nagler, 15 Green Hill La., Spring Valley, N.Y. 10977

[21] Appl. No.: 929,327

[22] Filed: Nov. 10, 1986

[51] Int. Cl.$^4$ .................. G02B 23/10; G02B 23/04; G02B 27/32

[52] U.S. Cl. .................................. 350/545; 350/171; 350/557; 350/566; 356/251; 356/254; 356/255

[58] Field of Search ............... 350/566, 565, 564, 562, 350/567, 568, 557, 558, 576, 537, 541, 545, 171, 174; 356/251–255

[56] References Cited

U.S. PATENT DOCUMENTS

| | | | |
|---|---|---|---|
| 828,511 | 8/1906 | Saegmuller | 350/557 |
| 2,978,950 | 4/1961 | Mandler | 356/255 |
| 3,107,270 | 10/1963 | Hildebrand | 350/564 |
| 3,362,074 | 1/1968 | Luebkeman et al. | 350/566 |
| 3,524,710 | 8/1970 | Rickert | 356/251 |
| 3,836,263 | 9/1974 | Rickert | 356/251 |

FOREIGN PATENT DOCUMENTS 547709 6/1972 U.S.S.R. ............................. 350/566

*Primary Examiner*—Jon W. Henry
*Attorney, Agent, or Firm*—William P. Keegan

[57] ABSTRACT

A finder or sighting scope for use with an astronomical telescope, the finder scope having a target member or reticle located at the common focus of the scope objective and the eyepiece. The target member or reticle may be seen as a magnified telescope view when viewed through the eyepiece and as a target or star image against the backdrop of the sky as viewed by a naked eye, the target or star image being projected into the viewer's line of sight by the objective and a mirror and beamsplitter.

18 Claims, 2 Drawing Sheets

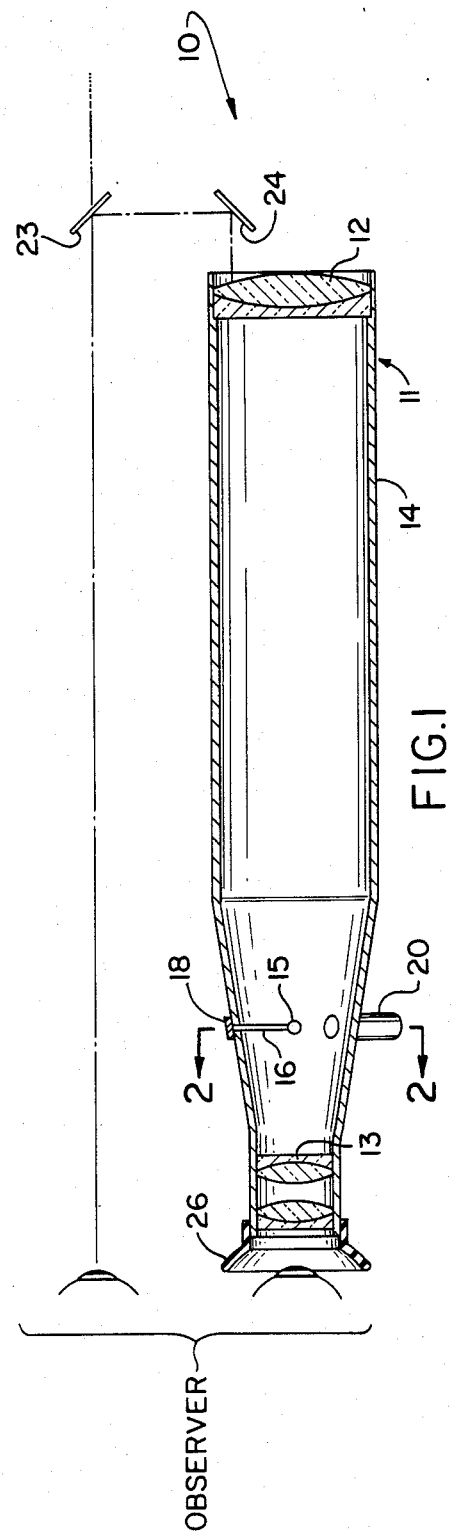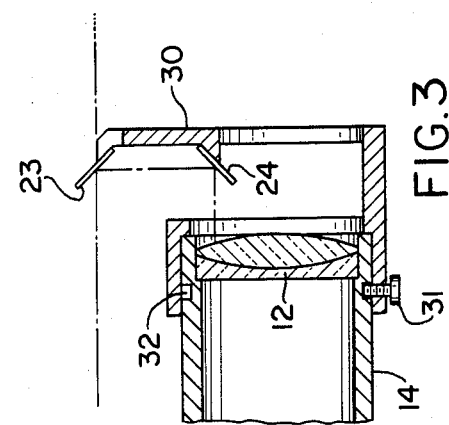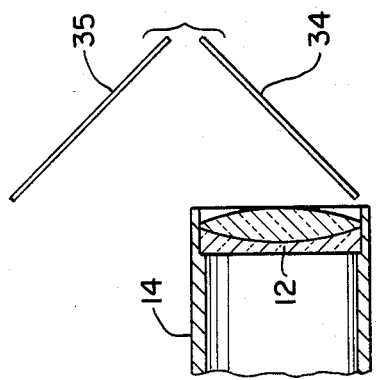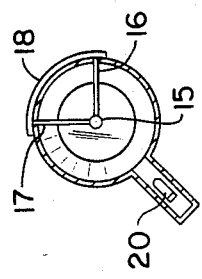

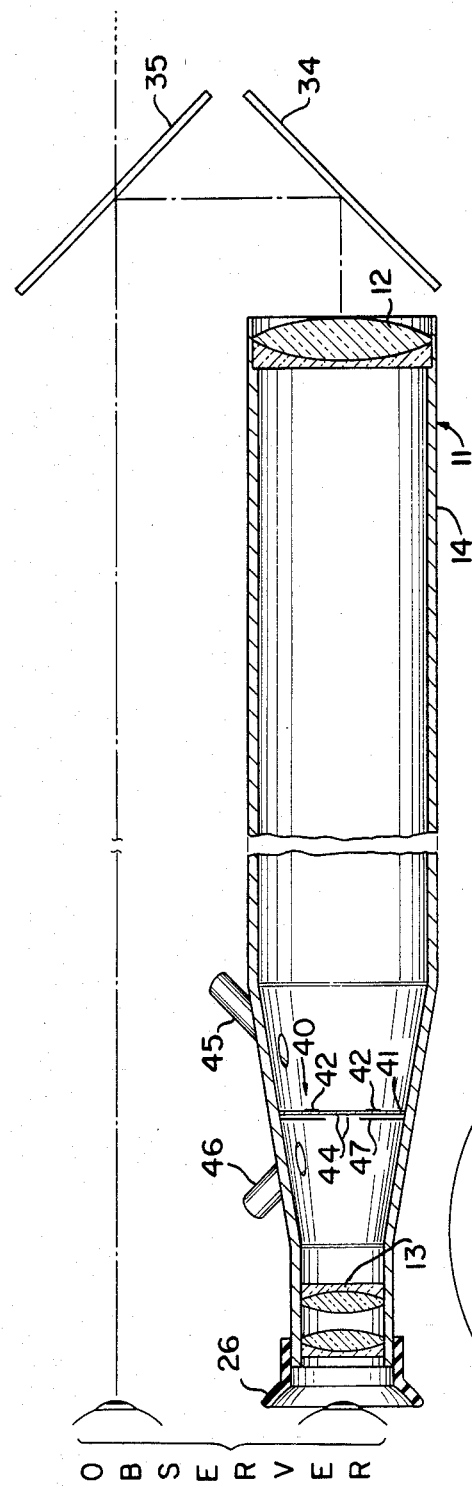
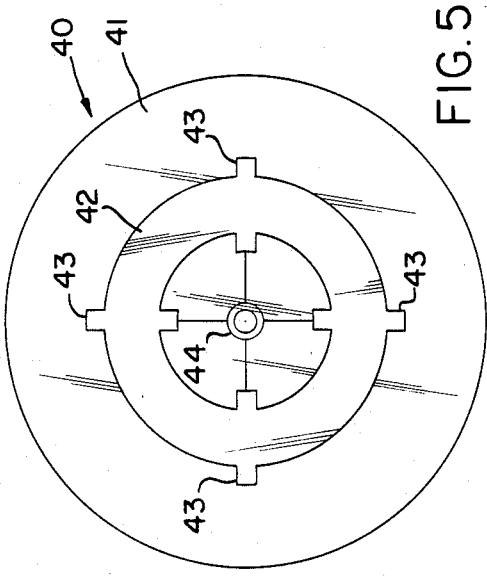

FINDER SCOPE FOR USE WITH ASTRONOMICAL TELESCOPES

FIELD OF THE INVENTION

This invention relates to astronomical telescopes, and more particularly to a finder or spotting scope for aiming an astronomical telescope at celestial objects to be viewed.

BACKGROUND OF THE INVENTION

In general, a high power telescope of the type used for astronomical Viewing has a very small field of view, e.g., approximately a ½ degree field. This makes it difficult for an observer to find the object to be viewed in the sky while looking through the telescope. In order to assist the observer in orienting the telescope to that portion of the sky in which the object to be viewed is, a finder scope having a much larger field of view is usually coupled to the telescope. The observer will use the finder scope to scan the sky and thus point the main telescope in the general direction of the object to be viewed. With the main telescope thus aimed in the general direction of the object to be viewed, it becomes a much easier task to zero in on the object while looking through the main telescope. Such finder scopes have been low power telescopes having a relatively large field of view.

GENERAL DESCRIPTION OF THE INVENTION

It is the object of the invention to provide an improved finder scope for use with astronomical telescopes.

It is another object of the invention to provide a finder scope that projects a target light spot that enhances aiming of the finder scope by projecting an artificial star image into the star field seen by the naked eye.

It is another object of the invention to provide a finder scope having a target light spot that can be varied in size and level of illumination.

It is still another object of the invention to provide a finder scope that permits monocular or binocular viewing of the target light spot used to facilitate aiming of the scope.

It is yet another object of the invention to provide a binocular finder scope in which one eYe sees a naked eYe view of the target light spot projected to infinity while the other eye sees a similar magnified telescopic view.

In carrying out the invention there is provided a finder scope in which an illuminated target is provided on the optical axis at the principal focus of the scope objective. A binocular parallel viewing axis is provided with a beamsplitter oriented 45 degrees to the viewing axis and a mirror oriented 90 degrees to the beamsplitter located at a position in front of the scope's objective. The arrangement is such that the illuminated target appears to be at infinity when seen along the optical path formed by the beamsplitter, mirror, and scope objective.

Features and advantages of the invention may be gained from the foregoing and from the following description of a preferred embodiment of the invention.

DESCRIPTION OF THE DRAWING

FIG. 1 is a schematic representation of the improved finder scope;

FIG. 2 is a schematic sectional view taken along line 2—2 of FIG. 1;

FIG. 3 is a schematic fragmentary view showing how the beam splitter and mirror assembly may be mounted for rotational positioning around the optical axis of the objective lens of the finder scope;

FIG. 4 is a schematic fragmentary view showing another embodiment of the invention employing a full aperture beamsplitter;

FIG. 5 is a schematic representation of a target reticle that may be used in the finder scope; and FIG. 6 is a fragmentary representation of the finder scope embodying the target reticle.

DETAILED DESCRIPTION OF THE INVENTION

Referring to FIG. 1, the finder scope 10 is shown comprising a relatively low power telescope 11 having an objective lens 12 and an an eyepiece 13 mounted in a telescope housing 14. Located in housing 14 is a target 15 positioned on the optical axis of telescope 11 and at its principal focus. Target 15 may be a highly polished ball bearing supported on two struts 16 and 17 extending inwardly from telescope housing 14. The target is illuminated by a light source 20, which typically may be a red light emitting diode, or it may be an incandescent lamp. Light source 20 may be battery powered and it may be controlled by a rheostat for adjusting the amount of light falling on the target and hence the brightness of the target. In either case, a virtual image of the LED or the illuminator bulb is formed inside the ball bearing, i.e., target 15. This virtual image is placed at the common focus of the telescope eyepiece and objective.

If it is desired to alter the target size or brightness, a differently sized or polished ball bearing may be used. The target 15 and struts 16, 17 may be constructed with an arcuate plate 18 to form a removable assembly that can be inserted through a slot formed in housing 14. In this way various combinations of target size and brightness can readily be provided. Alternatively, a small prism may be used as the target, instead of the ball bearing, with the faces marked for different sizes and the surfaces ground to provide target spots of desired size and reflectivity.

Spaced from the optical axis of telescope 11 by approximately 65 millimeters (the average spacing of an observer's eyes) is a 45 degree beamsplitter 23 positioned forward of telescope objective 12 and in alignment with 45 degree mirror 24. A rotatable mounting 30 can be provided as shown in FIG. 3 to carry beamsplitter 23 and mirror 24. With such an arrangement, mounting 30 may be rotated about telescope housing 14 in order that binocular viewing is possible in any orientation. However, interocular separation adjustment will not be provided with the structure illustrated, although a more complex structure could provide interocular separation adjustment and adjustable binocular orientation of finder scope 10. Mounting 30 is rotatably supported on the forward end of telescope housing 14. The mounting can be locked in a desired position by tightening thumbscrew 31 in peripheral groove 32 provided on the outside surface of housing 14.

Full aperture beamsplitters may be used in place of beamsplitter 23 and mirror 24 to provide an observer with a larger viewing area, although with a fainter target. See FIG. 4 wherein full aperture beamslitters 34 and 35 are illustrated. Also, a relay lens may be provided in telescope 11 to provide an upright view of the observed area, but, of course, it would not be necessary for astronomical viewing.

A second embodiment of the invention would include a target reticle 40 instead of the ball bearing target 15 previously disclosed. This embodiment is schematically illustrated in FIGS. 5 and 6 of the drawing. The target reticle 40 is a clear glass disk 41 provided with a silvered (aluminized) coating that has a light scattering characteristic to reflect light over a broad angle. The pattern illustrated in FIG. 5 has been found to be quite satisfactory, but other patterns may be used. The coating comprises an outer reflective annular ring 42 intersected by radially disposed reflective segments 43, and an inner reflective annular ring 44. Reticle 40 will be located in telescope 11 at its principal focus with the optical axis of the telescope passing perpendicularly through the center of the target pattern and full aperture beamsplitters 34 and 35 will be used because of the extended area of reticle 40.

While a single light source can be provided at the edge of and in the plane of the target pattern to illuminate both outer ring 42 and inner ring 44, two separate light sources are preferred. One source 45 will illuminate the outer reflective ring 42, and the other light source 46 will illuminate the inner reflective ring 44. The light sources are angled at the respective parts of the pattern they are intended to illuminate so that the light passing through the clear part of reticle 40 strikes the blackened interior wall of telescope 11 and is not seen directly through the eyepiece or the objective. Moreover, use of two light sources permits the separate parts of the pattern to be illuminated differently by controlling the intensity of each of the two light sources with separate rheostat controls. Additionally, two light sources will even permit different color light sources for each separate part of the pattern.

A field stop baffle 47 is provided so that the illuminated outer ring 42 of the target pattern is not seen through the eyepiece.

It is to be noted that if, for example, in an 8× telescope, the outer ring pattern 42 is eight times the diameter and eight times the thickness of the inner ring pattern 44, the patterns will appear to an observer to have the same angular size through the eyepiece and through the beamsplitter.

In operation, the finder scope 10 herein disclosed would be mounted in common adjustable support rings for alignment with the astronomical telescope for which it serves as a finder scope. When the light source 20 is energized, light rays from the target 15, projected towards both eyepiece 13 and objective 12, and since the target is located in the focal planes of both lenses, the projected light will be collimated by both lenses. The light passing through eyepiece 13 will go directly to one of the observer's eyes while the light passing through objective 12 is reflected by mirror 24 and beamsplitter 23 (FIG. 1 embodiment) to the observer's other eye. Thus, the eye peering through eyepiece 13 sees the target 15 as though it were at infinity, or as a star image, as does the eye peering through beamsplitter 23.

The star image formed by target 15 is superimposed on the observer's general view as seen through telescope 11 and the naked eye view seen through beamsplitter 23. Since the star image is formed by a single component, i.e., target 15, no misalignment is possible and no adjustment is necessary to align the binocular view. The projected star image makes it easier to aim the astronomical telescope at the desired viewing area of the sky, and the binocular capability of the finder scope enhances that task, by making it easier to aim the finder scope, using the naked eye star image as a unit power infinity reference for aiming the finder telescope 11.

When the target reticle 40 is used instead of the ball bearing target 15, the smaller pattern, i.e., ring 44 will be seen magnified by the eyepiece while the larger pattern, i.e., ring 42, will be more easily seen by the objective/beamsplitter combination 34, 35 as shown in FIG. 6.

Having thus described the invention, it is to be understood that many apparently widely different embodiments of the invention can be made without departing from its spirit and scope. Therefore, it is to be understood that the specification and the accompanying drawing be interpreted as illustrative and not in a limiting sense.

What is claimed is:

1. A finder scope for use with astronomical telescopes comprising, a low power telescope having a relatively large field of view, illuminated target means located in the common focal plane of the telescope objective and the eyepiece, mirror means located in front of the telescope objective so as to reflect a collimated image of said target means at an angle to the optical axis of said telescope, beamsplitter means spaced from said mirror means for reflecting the collimated image of said target means along an axis parallel to but spaced from the optical axis of said telescope, whereby an observer viewing a star field along the parallel axis with a naked eye and through the telescope with the other eye sees an image of said target means as though it were a star in the star field being observed.

2. A finder scope according to claim 1 including mounting means for supporting said mirror means and said beamsplitter means on said telescope, said mounting means being rotatable around the optical axis of said telescope.

3. A finder scope according to claim 1 wherein said target means comprises a reflecting element located in the common focal plane of the telescope objective and the eyepiece, and means for illuminating said reflecting element.

4. A finder scope according to claim 3 wherein said illuminating means includes means for varying the level of illumination.

5. A finder scope according to claim 1 wherein said illuminated target means comprises a reticle having an inner pattern that is seen magnified by the eyepiece and a larger outer pattern that is seen through the telescope objective.

6. A finder scope according to claim 5 wherein the telescope objective has a focal length n times the focal length of the eyepiece and wherein the larger outer pattern is n times the size of the inner pattern in diameter and thickness.

7. A finder scope according to claim 5 including a field stop baffle located between the eyepiece and said reticle so that said larger outer pattern is not seen through said eyepiece.

8. A finder scope according to claim 6 including a field stop baffle located between the eyepiece and said reticle so that said larger outer pattern is not seen through said eyepiece.

9. A finder scope according to claim 5 wherein said illuminated target means comprises a first light source for illuminating said inner pattern and a second light source for illuminating said larger outer pattern.

10. A finder scope according to claim 6 wherein said illuminated target means comprises a first light source for illuminating said inner pattern and a second light source for illuminating said larger outer pattern.

11. A finder scope according to claim 9 wherein at least one of said light sources is rheostat controlled so that said inner pattern is illuminated differently than said larger outer pattern.

12. A finder scope according to claim 10 wherein at least one of said light sources is rheostat controlled so that said inner pattern is illuminated differently than said larger outer pattern.

13. A finder scope according to claim 9 wherein said light sources illuminate their respective patterns with different color light.

14. A finder scope according to claim 10 wherein said light sources illuminate their respective patterns with different color light.

15. A finder scope for use with astronomical telescopes comprising, a low power telescope having a relatively large field of view, illuminated target means located in the common focal plane of the telescope objective and the eyepiece, full aperture beamsplitter means located in front of the telescope objective so as to reflect a collimated image of said target means at an angle to the optical axis of said telescope, second beamsplitter means spaced from said beamsplitter means for reflecting the collimated image of said target means along an axis parallel to but spaced from the optical axis of said telescope, whereby an observer viewing a star field along the parallel axis with the naked eye and through the telescope with the other eye sees an image of said target means as though it were a star in the star field being observed.

16. A finder scope according to claim 15 including mounting means for supporting said beamsplitter means and said second beamsplitter means on said telescope, said mounting means being rotatable around the optical axis of said telescope.

17. A finder scope according to claim 15 wherein said target means comprises a reflecting element located in the common focal plane of the telescope objective and the eyepiece, and means for illuminating said reflecting element.

18. A finder scope according to claim 17 wherein said illuminting means includes means for varying the level of illumination.

* * * * *